Sept. 5, 1967   D. W. CHALMERS   3,339,890
SPEED CONTROL DEVICE FOR HYDRAULIC TURBINE
Filed Feb. 3, 1966   2 Sheets-Sheet 1

Inventor
Dennis W. Chalmers
By John P. Sines
Attorney

Sept. 5, 1967     D. W. CHALMERS     3,339,890

SPEED CONTROL DEVICE FOR HYDRAULIC TURBINE

Filed Feb. 3, 1966     2 Sheets-Sheet 2

Inventor
Dennis W. Chalmers
By John P. Hines
Attorney

United States Patent Office 3,339,890
Patented Sept. 5, 1967

3,339,890
SPEED CONTROL DEVICE FOR HYDRAULIC TURBINE
Dennis W. Chalmers, Galt, Ontario, Canada, assignor to Allis-Chalmers Manufacturing Company, Milwaukee, Wis.
Filed Feb. 3, 1966, Ser. No. 524,896
1 Claim. (Cl. 253—97)

This invention pertains to a speed control device for hydraulic turbines and more particularly to a device activated as a result of changes in speed of the turbine to cause a repositioning of the turbine wicket gates.

It is common practice to provide a speed sensing system in the form of a governor which senses a deviation of the turbine speed from a given base speed. The governor sends a signal to a device which controls the speed of the turbine by cutting off the flow of water through the turbine. This is accomplished by moving the turbine wicket gates to a position proportional to the signal emitted by the governor. In wicket gate control, it is common practice to provide a ring with all of the wicket gates attached thereto. The ring is rotated as a result of the governor signal to position each of the individual wicket gates in an exact same position.

It is the intention and general object of the subject invention to provide a speed control device for a hydraulic turbine wherein the wicket gates are positioned as a result of a signal emitted by a speed governor however wherein each individual wicket gate is separately controlled as a result of the governor signal.

An additional object of the subject invention is to provide a wicket gate control mechanism wherein individual servomotors are provided for each wicket gate.

A further object of the subject invention is to provide a mechanism for wicket gate control of the hereinbefore described type wherein each individual wicket gate servomotor is controlled by an individual signal comparing means which compares the governor signal with a feedback signal representative of the wicket gate position.

These and other objects of the subject invention will become more fully apparent as the following description is read in light of the attached drawing, wherein.

Figure 1:
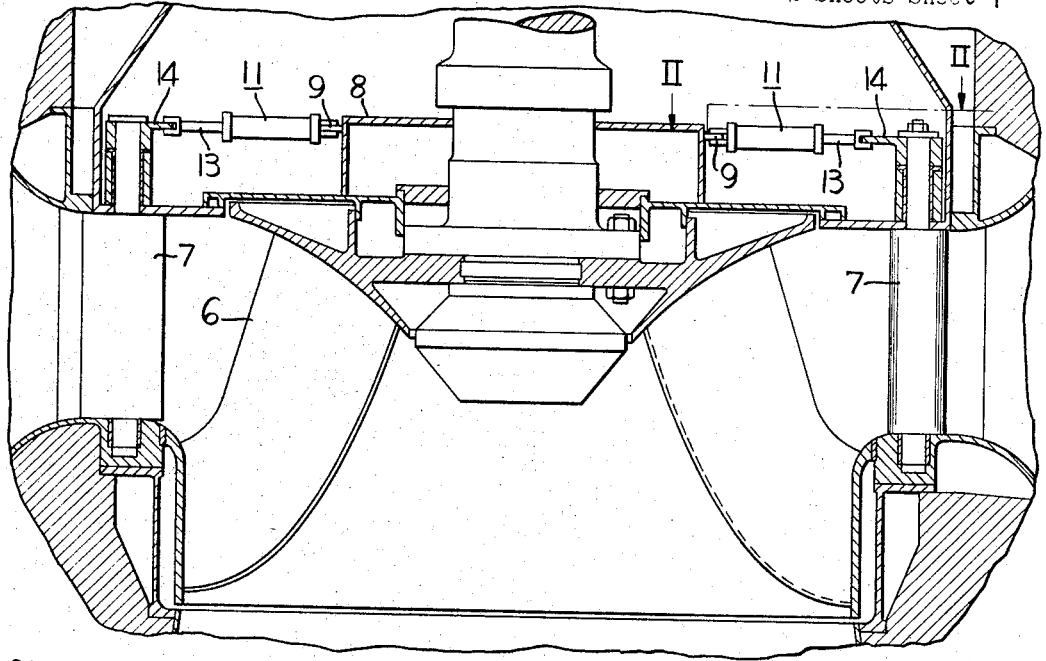
FIG. 1 is a cross sectional elevation of a hydraulic turbine installation provided with wicket gate control mechanism in accordance with the subject invention.
Figure 2:
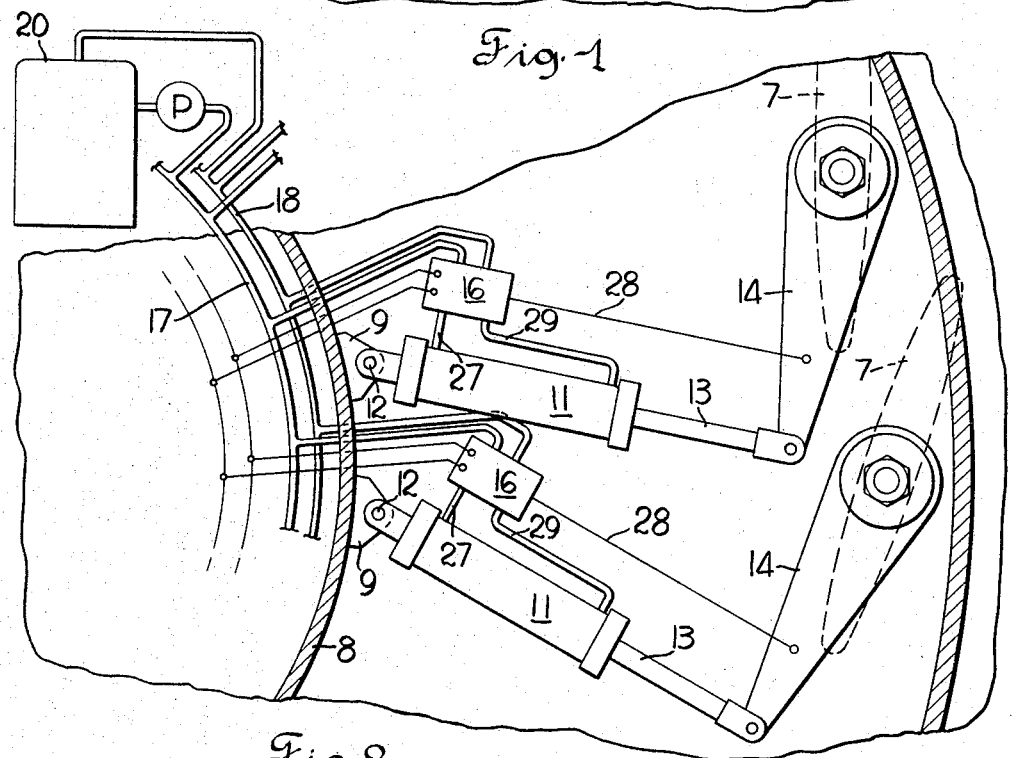
FIG. 2 is a partial plan view of the wicket gate control mechanism taken along the line II—II in FIG. 1.

Referring to the attached drawing, FIG. 1 shows a generally Francis type hydraulic turbine installation. The turbine runner 6 is rotatably mounted on a shaft in the conventional manner for Francis turbines. The water intake is peripherally located about the rotating axis of the turbine.

A plurality of circumferentially spaced wicket gates 7 are located in the turbine inlet. These wicket gates are mounted in any conventional manner for pivotal movement about their longitudinal axis between open and closed positions. In the closed position adjacent edges of each wicket gate contact one another to effectively block the flow of water to the turbine impeller thereby stopping the turbine.

A servomotor mounting ring 8 may be provided about the turbine shaft. A plurality of circumferentially spaced mounting lugs 9 are provided about the outer periphery of the servomotor mounting ring. Individual servomotors 11 are provided for each of the wicket gates and have one end thereof pivotally connected to a mounting lug by means of a pivot pin 12. The opposite end of the servomotor in this case the servomotor piston rod 13 is pivotally connected to a lever arm 14 which is in turn rigidly connected to the upper protruding end of the wicket gate shaft. These connections may be made in any conventional manner and it is not believed necessary to a complete understanding of the invention to describe thoroughly how each connection is made.

Each servomotor is provided with its own signal comparing means generally indicated 16. This signal comparing means may be an electrical, pneumatic or hydraulic device which compares a signal proportional to the speed of the turbine with the position of the wicket gate to open or close a valve providing pressurized hydraulic fluid to the servomotors. In this particular instance, an electric signal from the speed governor (not shown) is compared with the wicket gate position. Each signal comparing means is electrically connected in parallel to electrical lines which are connected to the speed governor. Also connected to each signal comparing means 16 is a pressurized hydraulic line 17 as well as a return line 18. The return line 18 is connected to the system sump 20.

Figure 3:
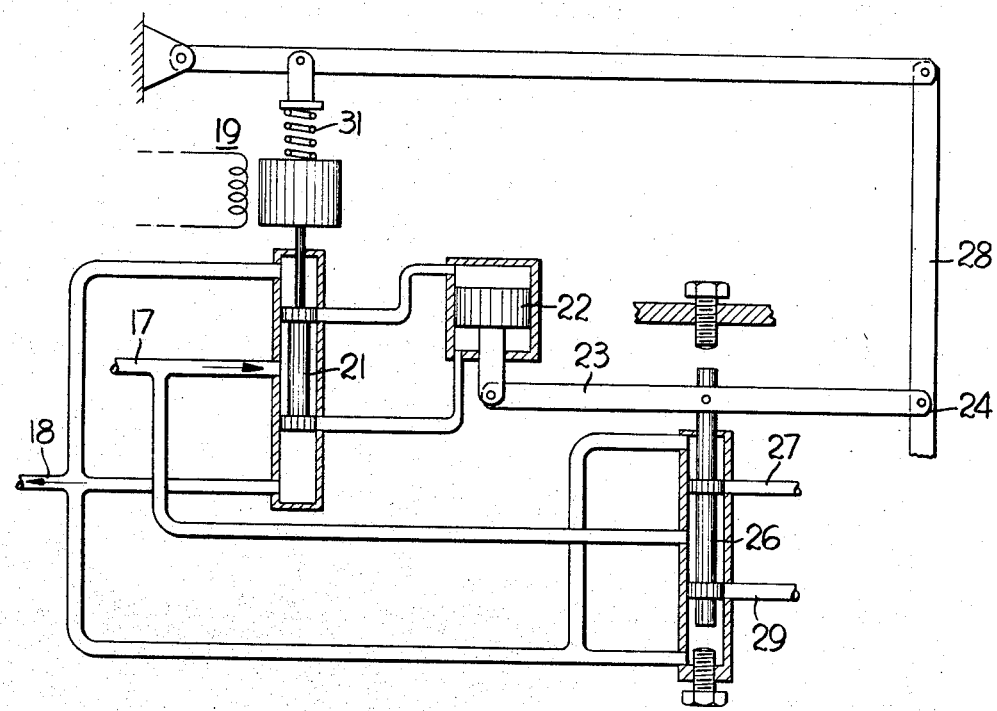
FIG. 3 is a schematic of the mechanism for comparing the speed signal from the governor with the feedback signal from the wicket gate.

Referring now to FIG. 3, the speed signal from the turbine governor is transmitted to the coils of the individual wicket gate transducers 19. The transducer accepts the electrical signal and converts it to a force upon a spool valve 21 of the first stage of hydraulic amplification. Pressurized fluid from the pressure line 17 is admitted to the spool valve 21. As viewed in the schematic of FIG. 3, when an overspeed signal is received by the transducer the spool valve 21 is moved downward permitting pressurized fluid to pass through the spool valve into the lower end of the beam piston 22. The beam piston 22 is connected to one end of a floating beam 23. The beam piston 22 moves upward, rotating the floating beam 23 about its opposite end 24 so as to cause the hyraulic servo motor spool valve 26 to move upward. This permits pressurized hydraulic fluid to pass through the servomotor spool valve into the servomotor feed line 27 and thence to the wicket gate servomotor 11. This causes the servomotor piston rod 13 to move outward pivoting the wicket gate lever 14 and hence the wicket gate to a closed position.

A feedback link 28 is connected to the wicket gate lever 14 and to the opposite end 24 of the floating beam. Upon movement of the wicket gate lever 14 in a closed direction the feedback link 28 moves downward as viewed in the schematic view of FIG. 3. This causes the floating beam to pivot about its connection to the beam piston 22. Such downward movement of the floating beam 23 causes the spool valve piston 26 to also move downward closing the wicket gate servomotor lines 27 and 29 thereby stopping further movement of the wicket gate. When the wicket gate has moved to the position as indicated by the signal from the speed governor the electric signal to the transducer is interrupted. This causes the spring 31 on the spool valve 21 to reposition the spool in its original position.

Should it be desired to open the wicket gates, a signal is fed to the transducer of an opposite polarity from that which causes the wicket gates to close. With such a signal the transducer spool valve 21 moves upward causing pressurized fluid to move into the upper portion of the beam piston 22. This causes the floating beam 23 to pivot downward about its end 24 causing pressurized fluid to move into the opposite end of the wicket gate servomotor 11 resulting in an opening movement of the wicket gate lever 14. This opening movement of the wicket gate lever is fed back to the floating beam 23 by means of the feedback link 28 resulting in a repositioning of the servomotor spool valve 26 in the closed position.

With this arrangement of individual servomotors and signal comparing means for each wicket gate, a finer adjustment of turbine speed can be obtained. It is not necessary that each of the wicket gates be positioned in an identical position as is the case when a single actuating ring with one servomotor is provided.

Although only one embodiment of the subject invention has been herein shown and described, it will be apparent after reading this description that other modifications can be effected without departing from the spirit of the invention and it is intended that all such modifications as come within the reasonable scope of the appended claim be covered.

The embodiments of the invention in which an exclusive property or privilege is claimed are defined as follows:

A device for controlling the position of wicket gates of a hydraulic turbine in response to a speed signal comprising: a fluid pressure operated servomotor connected to each wicket gate for moving same between open and closed positions; a source of pressurized fluid; a valve connected between each servomotor and said source for permitting and interrupting the flow of pressurized fluid to said servomotor; a signal comparing means connected to each valve means and responsive to said speed signal to open and close said valve; and feedback means connected to each wicket gate and the corresponding signal comparing means to deliver a signal to said signal comparing means indicating the position of the connected wicket gate, said signal comparing means being capable of comparing said feedback signal to said speed signal to open or close said valve means.

References Cited

UNITED STATES PATENTS

| | | | |
|---|---|---|---|
| 2,671,635 | 3/1954 | Willi | 253—117 |
| 2,954,206 | 9/1960 | Crawford | 253—24 |
| 3,030,070 | 4/1962 | Krauss | 253—143 X |
| 3,229,958 | 1/1966 | Borel | 253—97 X |

FOREIGN PATENTS 1,337,456  8/1963  France.

EDGAR W. GEOGHEGAN, *Primary Examiner.*

EVERETTE A. POWELL, JR., *Examiner.*